United States Patent [19]
Thomlinson et al.

[11] Patent Number: 6,044,155
[45] Date of Patent: Mar. 28, 2000

[54] METHOD AND SYSTEM FOR SECURELY ARCHIVING CORE DATA SECRETS

[75] Inventors: Matthew W. Thomlinson, Bellevue; Scott Field, Renton; Allan Cooper, Bellevue, all of Wash.

[73] Assignee: Microsoft Corporation, Redmond, Wash.

[21] Appl. No.: 08/996,634

[22] Filed: Dec. 23, 1997

Related U.S. Application Data

[63] Continuation-in-part of application No. 08/884,864, Jun. 30, 1997.

[51] Int. Cl.[7] .............................. H04K 1/00; H04K 9/00
[52] U.S. Cl. ................................................. 380/49; 380/25
[58] Field of Search ............................... 380/25, 49

[56] References Cited

U.S. PATENT DOCUMENTS

| | | | |
|---|---|---|---|
| 4,933,969 | 6/1990 | Marshall et al. | 380/125 |
| 5,432,851 | 7/1995 | Scheidt et al. | 380/25 |
| 5,495,533 | 2/1996 | Linehan et al. | 380/21 |
| 5,509,074 | 4/1996 | Choudhury et al. | 380/23 |
| 5,530,758 | 6/1996 | Marino, Jr., et al. | 380/49 |
| 5,555,304 | 9/1996 | Hasebe et al. | 380/4 |
| 5,748,735 | 5/1998 | Ganesan | 380/21 |
| 5,870,468 | 2/1999 | Harrison | 380/4 |
| 5,870,477 | 2/1999 | Sasaki et al. | 380/25 |
| 5,889,860 | 3/1999 | Eller et al. | 380/4 |
| 5,953,422 | 9/1999 | Angelo et al. | 380/23 |

FOREIGN PATENT DOCUMENTS

| | | | |
|---|---|---|---|
| 0 442 839 A3 | 1/1991 | European Pat. Off. | G06F 1/00 |
| 0 456 386 A2 | 4/1991 | European Pat. Off. | G06F 1/00 |
| 0 717 339 A2 | 11/1995 | European Pat. Off. | G06F 1/00 |
| 0 820 017 A2 | 3/1997 | European Pat. Off. | G06F 12/14 |

*Primary Examiner*—Tod R. Swann
*Assistant Examiner*—James W. Myhre
*Attorney, Agent, or Firm*—Lee & Hayes, PLLC

[57] ABSTRACT

The invention provides central storage for core data secrets, referred to as data items. The data items are encrypted by a client computer using a client key that is derived from a logon secret, such as a password, supplied by a user during a network logon procedure. The client key is escrowed with the participation of a network supervisory computer such as a domain controller. The client sends the client key to the domain controller. The domain controller appends a user identification corresponding to the currently authenticated user of the client computer, and encrypts the resulting combination. The encrypted combination is sent back to and stored locally by the client. To recover the client key, the encrypted combination is sent to the domain controller, which decrypts the combination to obtain the data item. However, the data item is returned to the client computer only if the decrypted user identification corresponds to the currently authenticated user of the client computer.

61 Claims, 5 Drawing Sheets

METHOD AND SYSTEM FOR SECURELY ARCHIVING CORE DATA SECRETS

RELATED APPLICATIONS

This application is a continuation-in-part of U.S. patent application Ser. No. 08/884,864, filed Jun. 30, 1997, by inventors Matthew W. Thomlinson, Scott Field, and Allan Cooper, entitled "Protected Storage of Core Data Secrets," still pending.

TECHNICAL FIELD

This invention relates to systems and methods that provide central services for securely storing core data secrets such as passwords, cryptographic keys, and sensitive personal or financial codes.

BACKGROUND OF THE INVENTION

Increasingly, financial and other sensitive transactions are being performed by personal computers. This has increased the need for secure storage of data. Modern cryptography techniques are often used to protect such data from unauthorized access.

New security methods, however, have brought about a need to store and protect "core" data secrets, such as private cryptographic keys, credit card numbers, and other small pieces of secret data. Presently, this responsibility is left to individual application programs or to personal computer users themselves. Although programs are available that allow users to encrypt and store data, such programs cannot typically be used by other application programs. Currently, each application program has to devise a safe and secure method to store such data.

As an example of the problems associated with the current state of the art, consider the issues involved in exploiting smart card technologies. A smart card is particularly well suited as a receptacle for core data secrets such as those described above. In addition, smart cards can be used to authenticate users by requiring each user to insert his or her personal smart card into a receptacle associated with the user's personal computer. Tamper-proof smart cards have been designed for just these purposes.

Problems arise without agreed-upon standards for using such devices. Although a developer could provide capabilities for working with a limited number of smart cards, it would be difficult or impossible to anticipate all the different variations that might eventually arise. This fact makes it impractical to implement smart card technology in various different applications.

Although some storage media such as magnetic hard disks do not present the challenges of smart cards, many software developers simply do not have the background and knowledge required to safely implement modern cryptographic techniques. Even if they did, it would be inefficient for each developer to undertake the complex task of developing a method of storing core secrets. Furthermore, resulting solutions would be incompatible. It would be much more preferable to adopt a common scheme for storing such data, and to avoid having to implement a new solution for every different application program.

The common scheme described below allows a user's core data secrets to be securely stored on the user's local computer. The core data secrets are encrypted on the user's computer with a locally generated encryption key that is derived from a logon secret (such as a password) supplied by a user during a logon procedure. A problem arises in network environments in which the user's password (or other authentication information) can change without participation of the local computer. This can happen, for instance, when a network administrator resets the user's password. It can also happen when a user changes his or her network logon password when using a different computer. When these events happen, it becomes impossible to regenerate the local encryption key. Thus, the inventors have realized a need to backup the local encryption key for potential recovery. However, it is not desirable to simply store the master key on the user's computer, since this would make it recoverable by hostile entities. Although the local key could itself be encrypted and stored on the local computer, this would involve another key which would then need to be protected. Thus, the invention concerns the storage of local encryption keys and other items that need to be securely stored on the user's local computer.

SUMMARY OF THE INVENTION

The invention described below provides central protected storage services that can be called by application programs to store core secrets. An embodiment of the invention is implemented as a server process and associated interfaces that can be invoked by application programs to store and retrieve small data items.

The general method and architecture includes a storage server and a plurality of installable storage providers and authentication providers. Each storage provider is adapted to securely store data using a specific type of media, such as magnetic media or smart cards. Details of the storage medium are hidden from the calling application programs. Authentication providers are used to authenticate users by different methods, such as by requesting passwords, by reading smart cards, by retinal scans, or by other ways that might be devised in the future. Again, authentication details are generally hidden from the calling application programs.

Application programs interact with the storage server through well-defined interfaces. A data item can be stored with a simple call to the storage server, and can be retrieved later with a similar call. All encryption, decryption, item integrity checks, and user authentication are performed by the storage server and its associated providers. Because of this, application programs can take advantage of advanced security features without adding complexity to the application programs themselves.

When storing a data item using the protected storage services, an application program can specify rules that determine when to allow access to the data item. Access is generally limited to the computer user that created the data item. Access can similarly be limited to specified application programs or to certain classes of application programs. The storage server authenticates requesting application programs before returning data to them.

A default authentication provider authenticates users based on their computer or network logon. Other authentication providers can also be installed.

A default storage provider allows storage of data items on magnetic media such as a hard disk or a floppy disk. Data items are encrypted before they are stored. The encryption uses a key that is derived from the authentication of the user. Specifically, the key is derived from the user's password, supplied during computer or network logon. In addition, an application program or the user can specify that certain items require an additional password to be entered whenever access to the data is requested.

The default storage provider implements a multi-level key encryption scheme to minimize the amount of encryption that has to be re-done when the user changes a password. Each data item is encrypted using an item key that is generated randomly by the system. The item key is in turn encrypted with a master key that is itself encrypted (as described below) with a key derived from the user-supplied password (such as the user's logon password).

In accordance with the invention, the master key (or any other key or data item that needs to be securely stored on the local computer) is sent to a network supervisory computer such as a domain controller. The network supervisory computer appends a user identification to the encrypted master key and encrypts the combination. The user identification is generated by the network supervisory computer based on the currently authenticated user of the local computer.

The encrypted combination is then returned to the local computer and stored there. If recovery of the master key becomes necessary, the encrypted combination is sent back to the network supervisory computer, which decrypts the combination to obtain the master key and the user identification. The network supervisory computer verifies that the user corresponding to the user identification has currently been authenticated at the local computer, and then sends the decrypted master key back to the local computer. The master key is not sent back to the local computer unless the currently authenticated user of the local computer is the user corresponding to the user identification in the encrypted data combination.

This methodology allow the local computer to store core data secrets in a way that prevents their recovery unless (a) the user of the local computer has been authenticated by a network supervisory computer and (b) the currently authenticated user is the same user that was responsible for saving the core data secrets in the first place. If a computer is stolen, a thief is not able to recover any of the core data secrets stored on the computer.

Further procedures are employed to provide further security and verification. For example, the local computer encrypts the master key before sending it to the network supervisory computer. This shrouds the information from the supervisory computer. As another example, a message authentication code is used on the master key and the user identification to verify that they have not been tampered with.

The network supervisory computer maintains its own master key for encrypting data submitted by client computers. The actual encryption, however, is based on an encryption key that is derived from the supervisory computer's master key and a random key that is generated for each data item submitted to the supervisory computer. This random key is also returned to the local computer. The local computer stores the random key along with the encrypted data combination. For recovery, the local computer submits the random key back to the network supervisory computer.

DETAILED DESCRIPTION

Cryptography Overview

Figure 1:
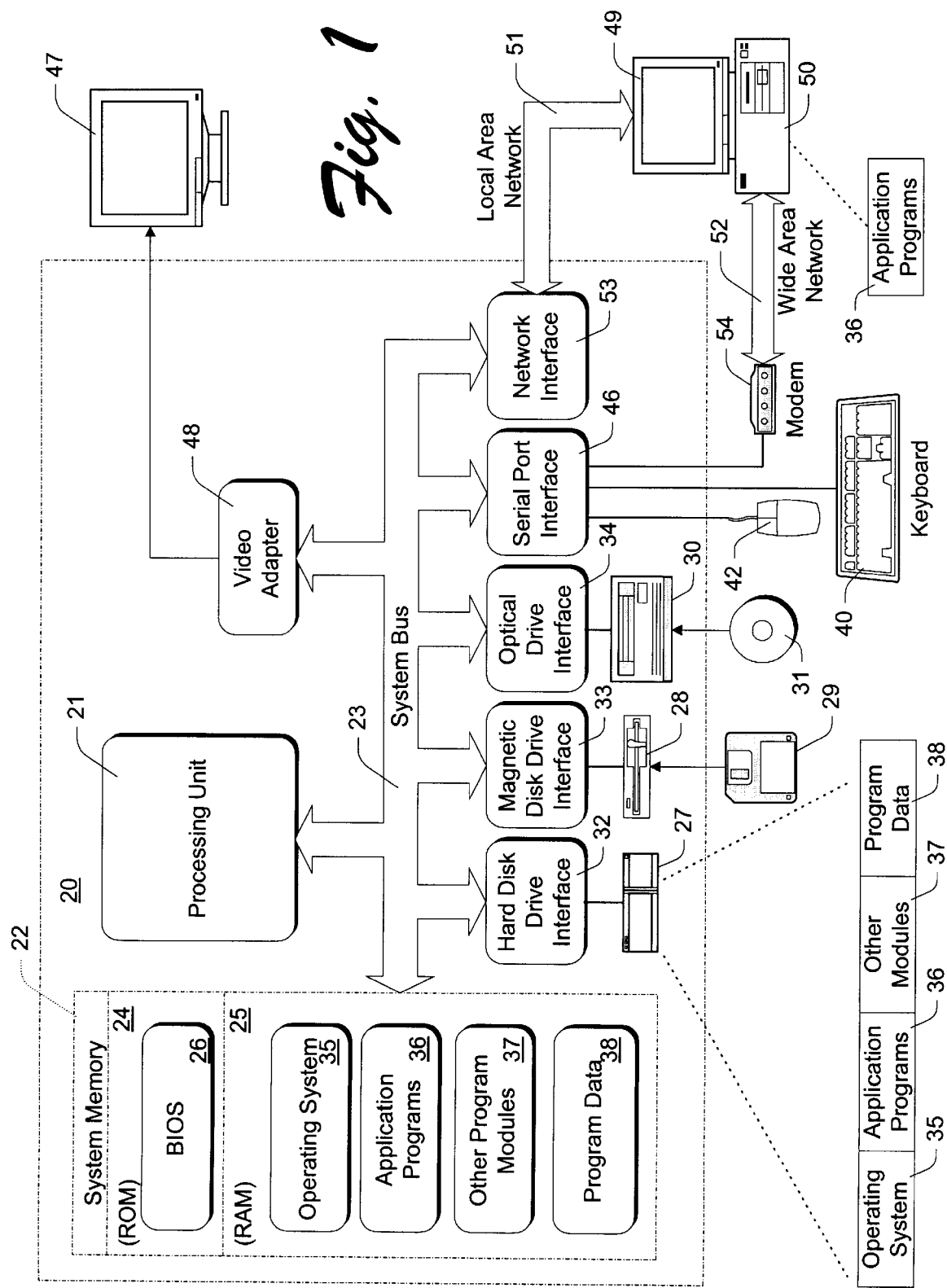
FIG. 1 is a block diagram of an exemplary computer system suitable for use in implementing the invention.

In general, cryptography is the process for encrypting or scrambling messages such that the messages can be stored and transmitted securely. Cryptography can be used to achieve secure communications, even when the transmission media (for example, the Internet) is untrustworthy. Computer users also use cryptography to encrypt sensitive files, so that an intruder cannot understand them. Cryptography can be used to ensure data integrity as well as to maintain secrecy. It is also possible to verify the origin of data items using cryptography, though the use of using digital signatures. When using cryptographic methods, only the cryptographic keys must remain secret. The algorithms, the key sizes, and file formats can be made public without compromising security.

Using data encryption, a data item can be scrambled so that it appears like random gibberish and is very difficult to transform back to the original data without a secret key. This message can consist of ASCII text, a database file, or any other data.

Once a data item has been encrypted, it can be stored on non-secure media or transmitted over a non-secure network, and still remain secret. Later, the message can be decrypted into its original form.

When a data item is encrypted, an encryption key is used. This is comparable to a key that is used to lock a padlock. To decrypt the message, a decryption key must be used. The encryption and decryption keys are often, but not always, the same key.

There are two main classes of encryption algorithms: symmetric algorithms and public-key algorithms (also known as asymmetric algorithms). Systems that use symmetric algorithms are sometimes referred to as conventional.

Symmetric algorithms are the most common type of encryption algorithm. They are known as symmetric because the same key is used for both encryption and decryption. Unlike the keys used with public-key algorithms, symmetric keys are frequently changed.

Compared to public-key algorithms, symmetric algorithms are very fast and, thus, are preferred when encrypting large amounts of data. Some of the more common symmetric algorithms are RC2, RC4, and the Data Encryption Standard (DES).

Public-key (asymmetric) algorithms use two different keys: the public key and the private key. The private key is kept private to the owner of the key pair, and the public key can be distributed to anyone who requests it (often by means of a certificate). If one key is used to encrypt a message, then the other key is required to decrypt the message.

Public-key algorithms are very slow—on the order of 1,000 times slower than symmetric algorithms. Consequently, they are typically used only to encrypt session keys. They are also used to digitally sign messages.

One of the most common public-key algorithms is the RSA Public-Key Cipher.

Digital signatures can be used to distribute an unencrypted data item, while allowing the recipients to be able to verify that the message comes from its purported sender and that it has not been tampered with. Signing a message does not alter the message, it simply generates a digital signature string that can either be bundled with the message or transmitted separately.

Digital signatures are generated by using public-key signature algorithms: a private key is used to generate the signature, and the corresponding public key is used to validate the signature.

Authentication involves the process of verifying the identity of a person or entity. Certificates are a common way to achieve authentication. A certificate is a set of data that completely identifies an entity, and is issued by a Certification Authority (CA) only after that Authority has verified that the entity is who it says it is. The data set includes the entity's public cryptographic key. When the sender of a message signs data with its private key (and sends a copy of its certificate with the message), the recipient of the message can use the sender's public key (retrieved from the certificate) to verify that the sender is who it says it is. Certificates can also be used to verify that data (including application programs) have been vouched for by a trusted source.

On a network, there is often a trusted application running on a secure computer that is known as the Certification Authority. This application knows the public key of each user. Certification Authorities dispense messages known as certificates, each of which contains the public key of one of its client users. Each certificate is signed with the private key of the Certification Authority.

The invention described below utilizes techniques such as the well-known digital encryption, signing, and authentication techniques described above. For further information regarding such techniques, refer to Schneier, Bruce; Applied Cryptography Second Edition: Protocols, Algorithms, and Source Code in C; John Wiley & Sons, 1996, which is hereby incorporated by reference. The following discussion assumes general familiarity with these topics.

Exemplary Operating Environment

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, pro gram modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus usage any of a variety of bus architectures. The system memory includes read only memory (ROM) 24 and random access memory (RAM) 25. A basic input/output system 26 (BIOS), containing the basic routines that help to transfer information between elements within personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The illustrated computer uses an operating system such as the Windows family of operating systems available from Microsoft Corporation. The functionality described below is implemented using standard programming techniques, including the use of OLE and COM interfaces such as described in Brockschmidt, Kraig; *Inside OLE* 2; Microsoft Press, 1994, which is hereby incorporated by reference.

More recent Windows operating systems utilize what is referred to as the Win32 API: a well-defined set of interfaces that allow application programs to utilize functionality provided by the Windows operating systems. The Win32 API is documented in numerous texts, including Simon, Richard; *Windows* 95 *Win32 Programming API Bible;* Waite Group Press, 1996, which is hereby incorporated by reference. General familiarity with this type of programming is assumed throughout the following discussion.

Overall Functionality and Architecture

Figure 2:
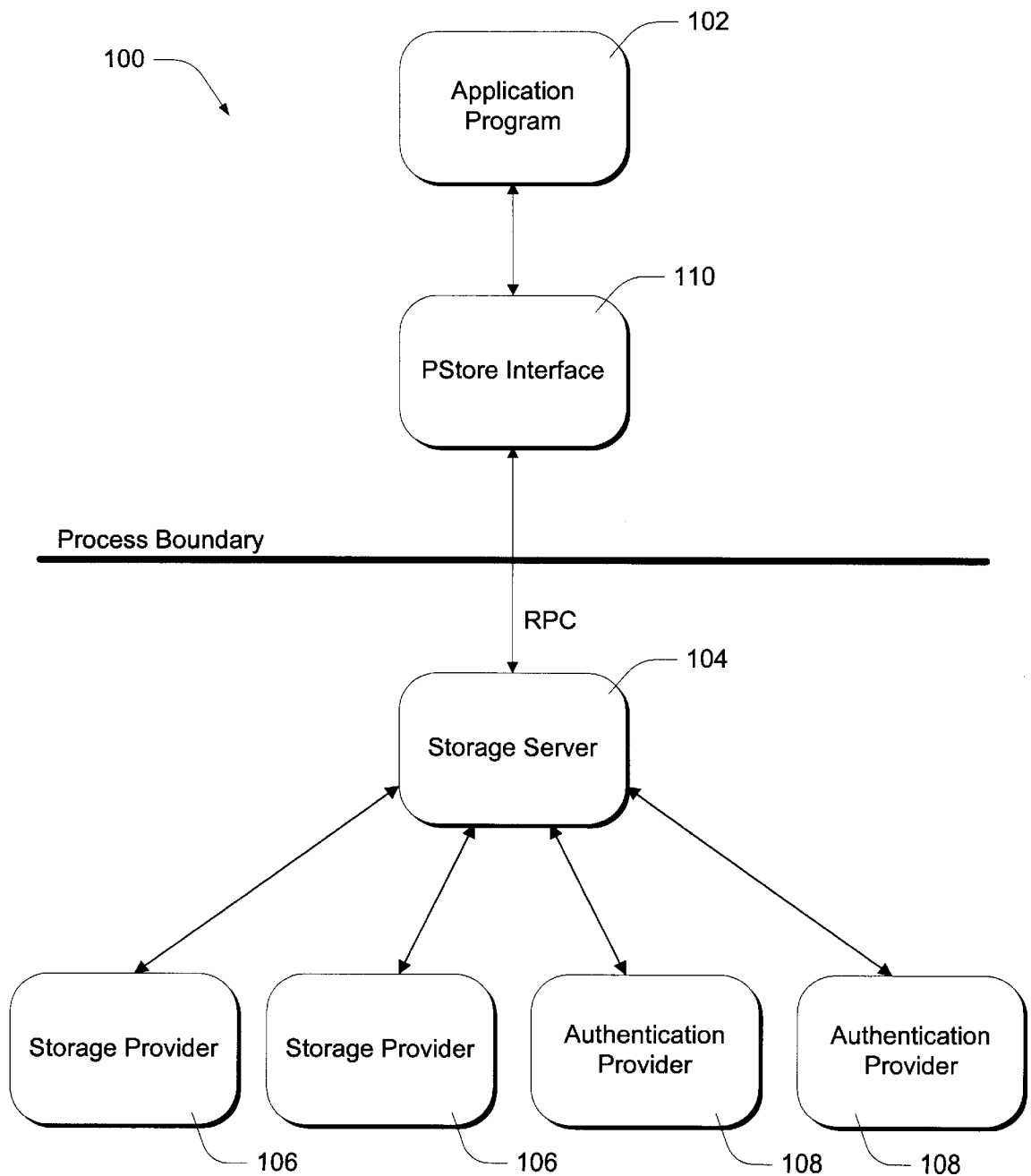
FIG. 2 is a block diagram of a protected storage system and a calling application program in accordance with the invention.

FIG. 2 shows architectural components of a protected storage system in accordance with the invention for storing data items and for protecting them from unauthorized access. The protected storage system allows application programs to securely store data items that must be kept private and free from tampering. Such data items might include cryptographic keys, passwords, financial information, trust profiles, etc. The storage system is designed to hold small items of core secret data in a central and common storage location; if a lot of data is to be protected, a bootstrap secret (such as an encryption key) may be stored in the storage system rather than the data itself. This enables data items to be moved when appropriate to small, secure hardware devices such as smart cards, and also avoids unnecessary overhead which would otherwise be required to secure large data items.

The protected storage system is executed by a computer such as described above with reference to FIG. 1. Application programs, such as application program 102 shown in FIG. 2, are also executed by the computer.

Storage system 100 includes a storage server component 104, also referred to as a dispatcher. Generally, the storage server, through the Pstore interface 110, receives data items from application programs, securely stores the data items, and returns such data items in response to requests from application programs. The storage server also performs authentication and verification procedures with respect to the requesting application programs, as will be explained in more detail below.

Associated with the storage server are a plurality of installable storage providers 106 and a plurality of installable authentication providers 108. Specified storage providers are called by the storage server to securely store and retrieve data items. One or more authentication providers are called by the storage server to identify and/or authenticate current computer users.

A default storage provider is implemented within the storage system. The default storage provider encrypts data items and then stores them on a hard disk or floppy disk. The encryption is based on one or more keys that are derived from authentication of the current computer user. The default storage provider also verifies the integrity of data items when retrieving and decrypting them.

A default authentication provider is also implemented within the storage system. The default authentication provider is called by the storage server to identify current computer users based on previously completed operating system logon procedures. Specifically, the default authentication provider identifies the current computer user based on the logon identification and password provided by the user while logging on to the computer's operating system or to a network operating system.

Although default storage and authentication providers are implemented, additional providers can be installed in the future to take advantage of new storage and authentication technologies. For example, a smart card storage provider might be installed to allow storage of core data items on a smart card. A smart card authentication provider might similarly be provided to authenticate users by requiring them to insert their smart cards into a smart card reader. In either case, the smart card could utilize public-key cryptographic techniques.

Well-defined COM interfaces are used between the storage server and the various providers, allowing new providers to be easily installed and registered with the storage server. Application programs are able to make the same calls to storage server 102 regardless of which providers are used. Because of this, application programs can be written to take advantage of future technologies by simply interacting with storage server 102, and without having to concern themselves with the details of such future technologies.

To increase security, the protected storage system is implemented in a different address space than the calling application programs. Communications across the process or address space boundary take place using remote procedure calls (RPCs). Such calls can be made when operating under Windows operating systems and other operating systems. The functionality and formatting of RPC calls is documented in the Microsoft Win32 Software Development Kit.

Although application programs can make RPC calls directly, this complexity is avoided by providing a dynamically linked library (DLL) that can be executed in the application programs' address spaces. This library, referred to as Pstore Interface 110 in FIG. 2, implements a plurality of interfaces and associated methods that can be called by the application programs to exploit the full functionality of the protected storage system. The interfaces include methods for creating and reading data items, as well as other useful functions as described in an appendix to this document. The interfaces and methods in the described embodiment are implemented using the COM (component object model) interfaces of the Windows operating system.

Protected-Data Access Control

The protected storage system described herein has powerful data access control capability. The storage system offers two levels of data protection: application-level protection and user-level protection. At the application level, the storage server returns requested data items only to authorized requesting application programs. Furthermore, the storage server authenticates requesting application programs before returning individual data items. Application program authentication refers to a process of determining whether an application program has been tampered with, or to an alternative process of verifying a program's trustworthiness through use of public/private key cryptographic digital signatures or other means. Microsoft Authenticode is an available mechanism for verifying, through the use of digital signatures, that an application program has been published by a specified person, group, or organization, and that it is therefore trustworthy. Authenticode functionality is publicly available from Microsoft Corporation as part of its Win32 Software Development Kit.

In the embodiment describe herein, data items are organized in a hierarchical fashion by specifying types and subtypes as follows:

Type—Subtype—Data Item

There are predefined types and subtypes, and application programs can create new types and subtypes. Different protection levels can be established for data items falling under certain types and subtypes. Specifically, an access rule set is specified for each subtype. An access rule set contains rules for different types or subtypes of data items. Access to a data item of a particular subtype is granted if any single rule of the corresponding rule set is satisfied. Each access rule comprises a mode and one or more access clauses; all of the access clauses must be satisfied before the rule is considered satisfied. The mode indicates the type of access allowed if all the clauses in a rule are satisfied. Currently, there are two access modes defined: read and write access.

There are currently three types of access clauses: Authenticode, Binary Check, and Security Descriptor. Authenticode verifies the application program requesting access to the protected data is trusted and can optionally determine whether the originator, and thus the originator's application, can be trusted. Binary Check ensures that a program has not been tampered with since installation. The Security Descriptor clause provides access based on Windows NT access control lists (ACLs).

Authenticode is a well-documented product and service available from Microsoft Corporation. If the Authenticode clause was specified at the time of subtype creation, a check is made to see if the requesting application was signed or not, and if signed, by whom. The clause may specify a particular root, certificate issuer, publisher (signer), program name, or some combination of the foregoing. Access will not be granted unless the specified criteria are met. If no criteria specified, the verification amounts to allowing any Authenticode-verified application or module access to the data. Authenticode checking also verifies the binary image of the module under inspection.

The Binary Check is implemented by taking a hash of a binary image of an application program at initialization. When the application program asks for data at a later time, the storage system again takes a hash of the memory image and compares it to the original hash. The two hashes must match before the protected storage system will allow the application program to access requested data. Thus, if the application has changed since it was installed, and therefore is likely to have been tampered with, the data will be protected and access to the data by the application will be denied.

The Security Descriptor clause is intended to allow access only to specified users or groups, and is enforced on Windows NT platforms. This clause gets the necessary information about the users and groups from the ACLs contained in the Windows NT security descriptor.

At the user level, the storage server allows access to individual data items depending on the current computer user; by default, only the user responsible for creating the data item is allowed to access it. However, a user can override this default behavior by specifying appropriate options when creating and saving data items, or the user can later modify access rights to the data.

Users and application programs can specify security styles, which specify a degree and/or type of confirmation or authentication is required to access a particular data item; for instance, whether a password is required. The current embodiment, with the default authentication provider, supports the following access styles:

Silent access: no user interaction required. Authentication is based on a previously completed computer or network operating system authentication procedure. In most cases, this type of authentication relies on the user being able to enter the correct password during a previous logon procedure, and no further interaction is required when protected data is actually accessed.

Logon password: a dialog box is presented requiring the user to enter the password previously used to logon to the computer or network.

User-defined password: the user specifies a password when an item is initially stored, and must enter the password before the data can be accessed again. Such passwords can be different for different data items, or groups of data items can be stored under the same password.

OK/cancel: when an application attempts to access the data, a dialog box appears. The user responds to the dialog box by clicking on an OK or deny button, thereby granting/denying access to the data by a requesting application program.

As is apparent from the different types of access styles, accessing items in protected storage may require user interaction. This interaction is implemented through the use of a user alert dialog box. Typically, the user will be required to enter a password in response to a user alert dialog box. However, different authentication providers might require different types of responses (such as physical insertion of a hardware token or biometric authentication procedures).

To prevent attacking programs from presenting similar user alert dialogs, and thereby gaining access to secret data, the user alert dialogs can be customized by the user. Specifically, a user can specify a particular background or digital watermark to be used in the user alert dialog box. Alternatively, such a watermark can be randomly generated for the user. The user will become familiar with whatever watermark has been selected, and will thus recognize unauthorized dialog boxes generated by attacking applications.

Data Encryption, Decryption, and Authentication

Different storage providers may protect stored data in different ways. However, some type of cryptography will usually be employed. The default storage provider described herein uses a password-based encryption scheme, wherein data items are encrypted based on a user-supplied password, or some other code related to user authentication, before storing the data items. When retrieving the data items, decryption is based on the same password or code.

When a data item is protected by the "user-defined password" security style mentioned above, the user explicitly enters a password for each data item during an authentication step that is invoked prior to allowing access to an individual data item. In the case of "silent access," however, encryption and decryption are based on a password or other code that is supplied by the current computer user during a previous computer or network operating system authentication or logon procedure. Typically, a user's logon name and password are used to form or derive a key that is used for encrypting and decrypting data items.

Figure 3:
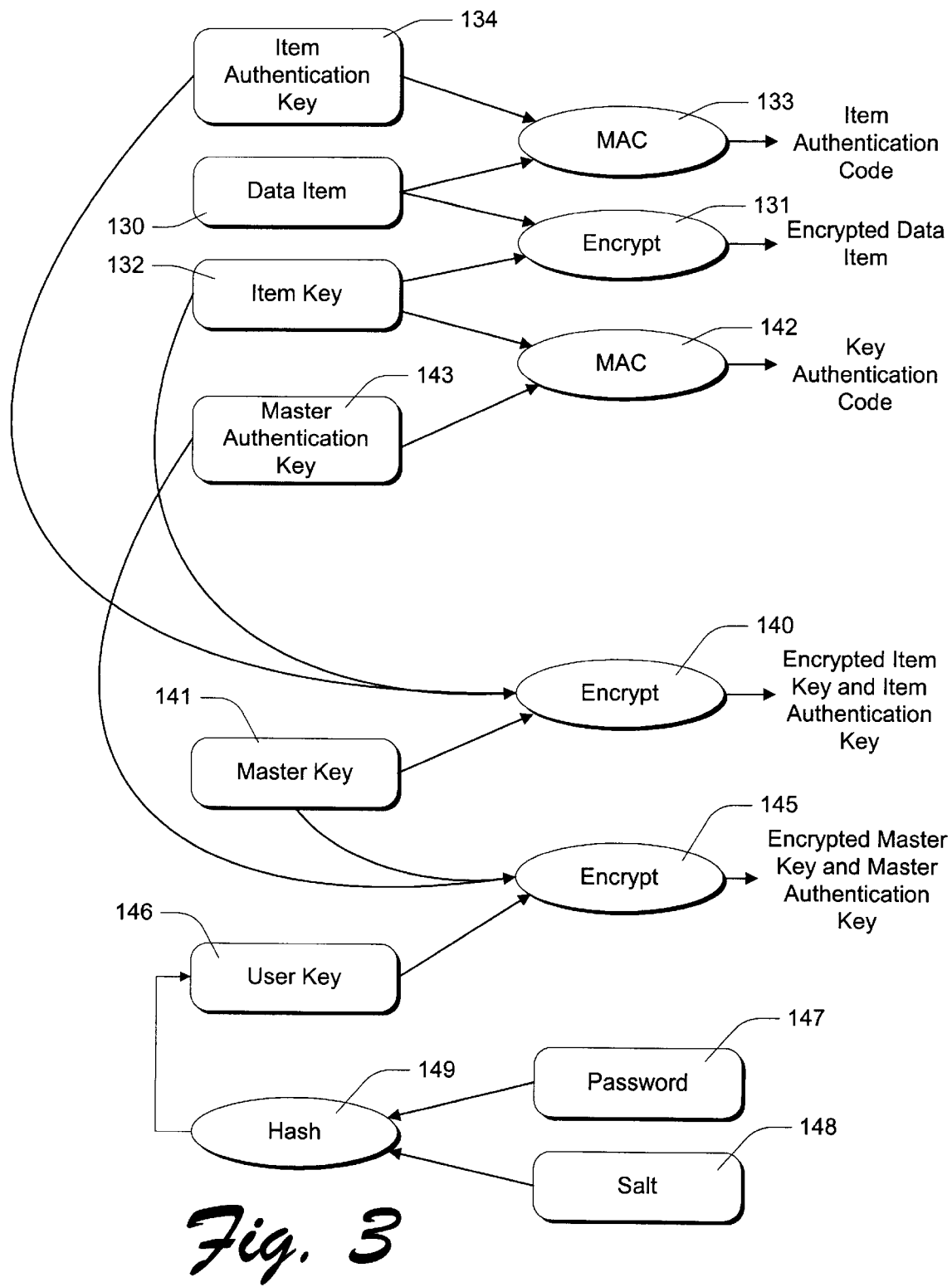
FIG. 3 is a process diagram illustrating how data items are encrypted and authenticated in accordance with the invention.

In the described embodiment, a multi-level key technique is used to encrypt data items based on user-supplied codes or passwords. This technique is illustrated in FIG. 3. In this implementation, encryption and decryption use one or more keys that are derived from the supplied passwords or logon codes. As mentioned, the password or code can either be gathered from a previous authentication step, or the storage system might prompt the current computer user for a password.

Generally, an item key is randomly generated for each data item. The data item is encrypted with its corresponding item key. An item authentication key is also generated randomly for each item and is used to generate an item authentication code. Item authentication codes are used during decryption to verify that data items are decrypted correctly.

The item key and item authentication key are then encrypted using a master key. The master key is a randomly generated number. A master authentication key is also generated and used to calculate a key authentication code so that the correct decryption of the item key and item authentication key can be verified later. Finally, the master key and master authentication key are encrypted using a password that is derived from user authentication or identification.

With reference now to the specific steps of FIG. 3, an individual data item that is to be encrypted and stored is referenced by numeral 130. A step or operation 131 is performed of encrypting data item 130 using an item key 132. Specifically, cryptographic key 132 is used to perform a DES encryption on data item 130. Item key 132 is generated as a random number by the default storage provider.

The storage provider also performs a step 133 of generating an item authentication code for individual data item 130. The item authentication code is generated using a MAC (message authentication code) in conjunction with a randomly generated item authentication key 134. MACs are described in the Schneier text mentioned above.

A further step 140 is performed of encrypting the item key 132 and the item authentication key 134 with a master key 141, again using the DES encryption mentioned above. The master key is a random number. A step 142 comprises generating a key authentication code for the combination of the item key and the item authentication key. The key authentication code is generated with a MAC in conjunction with a randomly generated master authentication key 143.

A step 145 is performed of encrypting the master key and the master authentication key with a user key 146. This is again a DES encryption.

The user key is derived from the user-supplied password or code, referenced in FIG. 3 by numeral 147. To generate the user key, the user-supplied password 147 is appended to a random number referred to as a salt 148, and hashed in a step 149 using an SHA-1 hashing function. This results in a number that is used as the user key.

Once these steps are performed, the storage server stores the encrypted individual data item, the item authentication code, the encrypted item key, the encrypted item authentication key, the key authentication code, the encrypted master key, and the encrypted master authentication key, to be retrieved later when requested by an authorized application program.

Retrieval comprises the reverse process. The encrypted items are retrieved from storage. The storage provider derives the user key from the user-supplied password and uses the user key to decrypt the master key and master authentication key. The master authentication key is used in conjunction with the specified MAC to verify that the master key decrypted correctly. The master key is then used to decrypt an appropriate item key and corresponding item authentication key. The item authentication key is used in conjunction with the MAC to verify that the item key decrypted correctly. The item key is then used to decrypt the actual data item.

This process allows all of a user's data items to be controlled by a single master key that is in turn encrypted as a function of the user's password. The advantage of this scheme is that data items do not have to be re-encrypted when the user changes his or her password. Rather, only the master key needs to be encrypted again.

Key Backup and Recovery

As described, the user key and master key can be derived from a password or other code that is supplied by the current computer user during a previous computer or network operating system authentication or logon procedure. A potential problem arises when the user's network password is changed without participation of the local computer. This might happen, for instance, when the user changes his or her network logon password while using a different computer. It might also happen when the user's password is reset by a system administrator.

The invention includes a way to recover the user key or the master key in this situation. Although described in the specific context of a local encryption key that is derived from a user logon secret, the invention can also be used for backing up and recovering any core data secret or data item.

One way to backup the master key would be to simply store it on the local hard disk. However, the key would then be available for use by hostile entities such as viruses or unauthorized computer users. It could alternatively be backed up on a server. This, however, would require significant overhead on the server. Instead, the inventors have developed a way to store the master key on the local computer without exposing it to hostile entities. Specifically, the master key or other data item cannot be accessed based on information stored by the local computer. Rather, decryption requires the participation of a network supervisory computer such as a network domain controller. However, the network supervisory controller is not required to store any information particular to the local computer or to the stored data secret. All data items are stored on the local computer while remaining inaccessible without the supervisory computer's participation.

Figure 4:
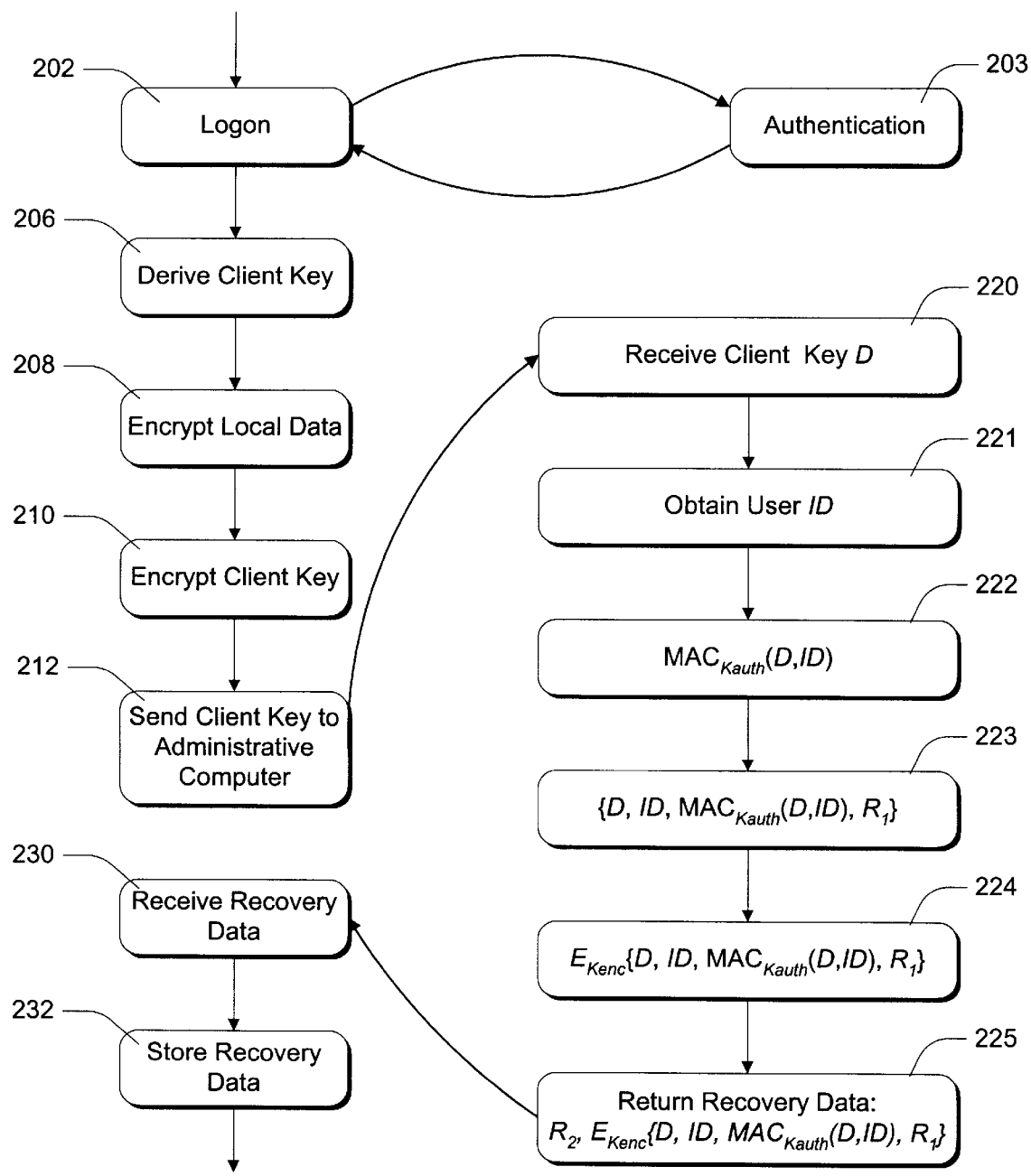
FIG. 4 is a flowchart showing steps performed to backup or escrow an encryption key or other data item in accordance with the invention.
Figure 5:
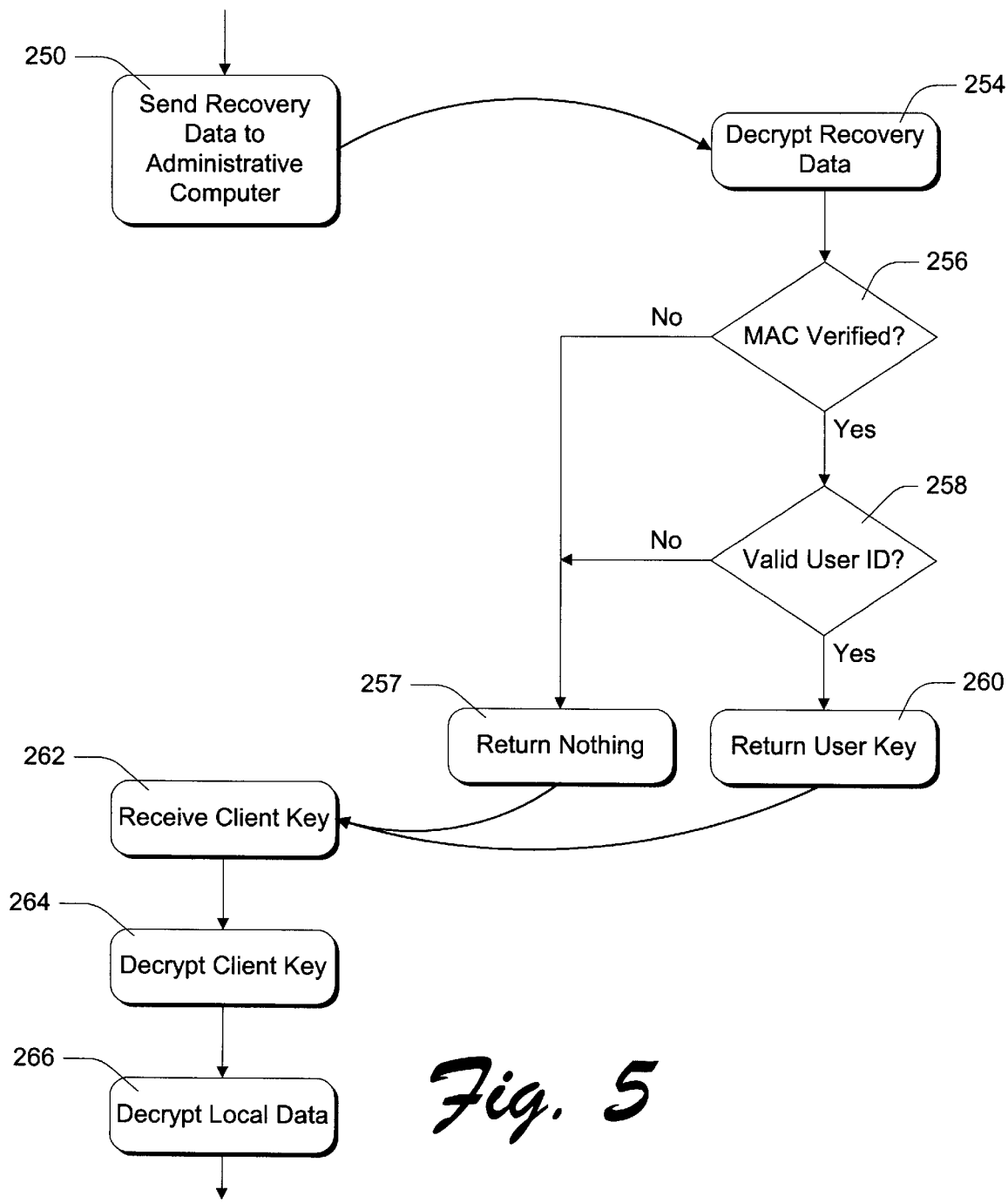
FIG. 5 is a flowchart showing steps performed to restore an encryption key or other data item in accordance with the invention.

FIGS. 4 and 5 illustrate a method of securely storing and recovering data protection keys and other data items. In the described embodiment, the protected data item is a local encryption key that is derived from a user-supplied password or other user secret during a network logon procedure. The steps on the left-hand sides of the drawings are performed by the storage provider 106 of local computer or network client 20. The steps on the right-hand sides of the drawings are performed by a domain controller or other network supervisory computer. For purposes of this discussion, computer 50 of FIG. 1 is considered to be a domain controller. The local computer communicates with the domain controller using conventional network technologies.

A domain controller is responsible for authenticating users before allowing such users to access network resources. Authentication involves a user logon process, during which the user is asked to submit some secret information such as a password or PIN. In the future, other authentication mechanisms might be used, such as smart cards, which would supply the requested user secret on the user's behalf. Preferably, computer 50 is one of a plurality of domain controllers in a group of domain controllers that share responsibilities. A client computer, when logging on to a network, randomly selects one of the domain controllers to perform authentication steps and to perform the key backup steps described below.

FIG. 4 shows steps performed in securely storing an encryption key or other data item. Blocks 202 and 203 represent the step of authenticating a current user of a network client through a network logon procedure. This step happens when the current computer user begins using the local computer. The logon takes place at local computer 20 in step 202, and the local computer passes the logon information to domain controller 50 which authenticates the user in step 203. Generally, each user has a user identification and associated password that are entered in response to a logon prompt. These are compared against information maintained by domain controller 50 to determine whether the user is authorized to access network resources.

Step 206 comprises deriving the user key or master key, also referred to herein as a client key, from a logon password or some other user secret that is supplied by the current user during network logon procedures. The client key is derived as discussed above.

Step 208 comprises securing core data secrets or other local user data with the derived client key. In the embodiment described herein, the core data secrets are encrypted with the client key or with other keys that are derived from or encrypted with the client key. The encrypted core data secrets are stored using the storage server and storage providers described above.

Step 210 comprises an optional step of encrypting the client key. The client key is encrypted using an encryption key that is then stored locally by the client computer. This encryption is meant to shroud the client key from the domain controller during subsequent steps.

Step 212 comprises sending the encrypted client key to the network supervisory computer, after performing the optional step of encrypting the client key. A local copy of the client key is not maintained or stored on the local computer. Rather, the client key is sent to the supervisory computer, which returns encrypted recovery data from which the client key can be obtained. However, the client key cannot be obtained from the encrypted data by the local computer alone. Rather, subsequent recovery of the client key requires help from the supervisory computer.

The encrypted data returned by the supervisory computer and stored by the local computer will be referred to herein as key recovery data. Steps 220 through 225 are performed by network supervisory computer 50 to produce the key recovery data.

Step 220 comprises receiving the client key (optionally encrypted), which will be referred to herein as data item D. A step 221 comprises obtaining a user identification ID that corresponds to the currently authenticated user of the local computer that submitted data item D. This identification is normally maintained by the supervisory computer in response to a user logon procedure.

Step 222 comprises creating a message authentication code based at least in part on the client key and the user identification, using a message authentication key $K_{auth}$. The message authentication code is referred to herein as $MAC_{Kauth}(D,ID)$. $K_{auth}$ is derived from a fixed master key $K_{mast}$ and a first random key $K_{R1}$, using a predetermined one-way hash function. $K_{mast}$ is a key that is maintained by and stored at the network supervisory computer. $K_{R1}$ is a key that is generated for each individual user, or for each data item that is submitted to the network supervisory computer. $K_{R1}$ is not stored at the supervisory computer, but is returned to the local computer 20 in a subsequent step, along with encrypted versions of data item D and user identification ID.

Step 223 comprises appending the user identification ID, the first random key $R_1$, and the message authentication code $MAC(D,ID)_{KR1}$ to the data item D received from the client computer, to form a data combination as follows: {D, ID, $MAC_{Kauth}(D,ID)$, $R_1$}.

Step 224 comprises encrypting this data combination at the network supervisory computer. This encryption is performed using an encryption key $K_{enc}$. $K_{enc}$ is derived from fixed master key $K_{mast}$ and a second random key $K_{R2}$, using a predetermined on-way hash function. Similarly to $K_{R1}$, $K_{R2}$ is a key that is generated for each individual user or data item that is submitted to the network supervisory computer. Again, $K_{R2}$ is not stored at the supervisory computer, but is returned to the local computer 20 in a subsequent step. The encrypted data combination is represented as follows: $E_{Kenc}${D,ID, $MAC_{Kauth}(D,ID)$, $R_1$}.

The fixed master key $K_{mast}$ is preferably replicated across an entire group of domain controllers in a domain, thereby allowing any one of the domain controllers to perform key encryption and recovery operations. If one of the domain controllers becomes inoperational, its responsibilities (including key recovery responsibilities) are assumed by another one of the domain controllers.

Step 225 comprises a step of returning the encrypted data combination $E_{Kenc}${D, ID, $MAC_{Kauth}(D,ID)$, $R_1$} to the client computer, and returning second random key $R_2$ along with the encrypted data combination. The encrypted data combination and second random key $R_2$ comprise recovery data that can be resubmitted to the supervisory computer if it becomes necessary to recover data item D. In an alternative embodiment, $R_1$ can be excluded from the encrypted data combination, and returned separately to the client computer.

Step 230, performed by the client computer comprises receiving the recovery data from the supervisory computer. Subsequent step 232 comprises storing the recovery data locally (including random key $R_2$ and random key $R_1$ in some embodiments), on a hard disk or other non-volatile storage.

FIG. 5 shows the steps performed in order to recover a data item D that has been backed up or escrowed in the manner described above. The data item is said to be escrowed because neither the client computer nor the supervisory computer can access or make use of the data item without the participation of the other. In the invention embodiment described herein, the data item is recovered from the recovery data only when it becomes impossible to regenerate the data item from the user's logon password—such as when the password has changed. When storage provider 106 determines that this has occurred, and that it is necessary to recover the data item, it performs a step 250 of sending the recovery data $E_{Kenc}${D, ID, $MAC_{Kauth}(D,ID)$, $R_1$} as well as locally stored keys $R_1$ (if $R_1$ is stored apart from the encrypted data combination) and $R_2$ to the network supervisory computer. In response to receiving the recovery data, the supervisory computer uses the received $R_2$ to derive $K_{enc}$, and then performs a step 254 of decrypting $E_{Kenc}${D, ID, $MAC_{Kauth}(D,ID)$, $R_1$} to obtain data item D, user identification ID, message authentication code $MAC_{Kauth}(D,ID)$, and first random code $R_1$. $R_1$ is used in combination with $K_{mast}$ to derive message authentication key $K_{auth}$, and a step 256 is performed of verifying the authentication code $MAC_{K_{auth}}(D,ID)$. If this authentication fails, nothing is returned to the client (step 257). Otherwise, a step 228 is performed of determining whether the user identification contained in the recover data corresponds to the currently authenticated user of the client computer. A step 260 is performed only if the user identification obtained from the recovery data corresponds to the currently authenticated user of the client computer. Otherwise, nothing is returned to the client computer (step 257). Thus, step 260 is conditioned upon a successful authentication of the combined data item D and user identification ID, and upon a successful authentication of the user indicated by the user identification contained in the recovery data.

Assuming that authentication steps 256 and 258 succeed, client computer 20 receives data item D in step 262 and performs a step 264 of decrypting the data item to obtain the client key that was previously used to safeguard local data. A step 266 is performed of decrypting or unlocking the local data with the client key. The local key is then used by storage provider 106 to unlock any secured data.

Verification of Storage System Integrity

The storage server, the storage providers, and the authentication providers employ a security interlock mechanism to prevent security violations that might result from tampering with system components. This mechanism utilizes cryptographic techniques.

One motivation for the security interlock mechanism is to prevent non-authorized providers from being loaded by the storage server. It is particularly important to prevent a non-authorized module from masquerading as an authorized provider, since such a non-authorized module could steal secret data from the system. Another motivation is to prevent tampering with the storage server itself.

When the server and providers are shipped, they are digitally signed with the private key of a public/private cryptographic key pair-the private key has a corresponding public key. The public key is then hard-coded into the various modules of the server and providers. The server and the providers are configured to verify each others' signatures using the public cryptographic key whenever an individual component is loaded and executed. When the server is loaded, it first checks its own integrity by checking its own digital signature with the public key. The server then checks the digital signatures of other core components as they are loaded. As each component is loaded, it checks the digital signature of the server. If any integrity check fails, none of the components will operate.

Authentication of Requesting Application Programs

As discussed above, access to data items can be restricted based on which application programs are trying to access the data items. For this feature to be reliable, the storage system needs to verify that application programs are who they say they are, and that they have not been tampered with. This process is referred to as program authentication. One option is to authenticate programs based on a binary check. Such an authentication is performed by two storage server modules: the identification module and the enforcement module.

The identification module is responsible for interrogating the client that is calling the storage server. In order to identify a process associated with a request, the following steps occur:

1. The client application program identifies itself to the server, presenting two pieces of information: a process ID, and a thread handle. The process ID is obtained using the GetCurrentProcessId( ) system call; the thread handle is obtained using the GetCurrentThread( ) and DuplicateHandle( ) system calls.
2. The storage server opens a handle to the client, using the process ID in a call to the system call OpenProcess( ). The storage server saves this handle for later use.
3. The client makes access requests for data items.
4. The server uses the process handle obtained above to analyze the memory address space associated with the client process. The server also uses this handle to query the underlying operating system about what executable modules (.exe, .dll, etc. files) are present in the associated process, in addition to determining module load addresses, the exact method used to query the operating system varies depending on the operating system.
5. The server now has a complete list of modules associated with the client, and uses it to analyze the call stack associated with the thread handle obtained above. The StackWalk( ) system call is utilized to determine the chain of callers associated with the client.

The enforcement module uses results provided by the identification module in performing the following checks:

1. Verifying that the image loaded into the client process has not been tampered with on-disk. This is accomplished by storing a cryptographic representation of the file(s) that are to be granted access. This cryptographic representation is stored alongside the data. There can be two cryptographic representations of the file:

The entire file is read and then subjected to the SHA-1 cryptographic hash. The output of the hash is stored alongside the data. When subsequent access to the data is requested, the hash is recomputed against the on-disk file, and then compared to that stored alongside the data. If these compare correctly, the process continues to check 2, below.

The file is subject to public key certificate-based validation. This uses Microsoft Authenticode calls to verify that the image has not been tampered with. Authenticode handles hashing the disk image internally. This cryptographic representation of the file is more flexible, because it also supports validation against various fields in the certificate attached to the specified file. After the Authenticode verification takes place, the system analyzes the certificate contents, to make sure they match those that were stored alongside the data being accessed.

2. Verifying that the image on disk matches that loaded into the client process.

The module to be checked is "mapped" into the server address space, using the CreateFileMapping( ) and MapViewOfFile( ) system API calls.

Relocation fixups are applied to the mapped image if necessary—only if the image did not load at the preferred address in the client address space.

The system loops over the image header, looking for read-only sections such as code sections, resources, and read-only data. For each section, it updates an SHA-1-based cryptographic hash.

The process handle output from the identification module is now used to read the memory address space where the module is loaded. This is accomplished by using the ReadProcessMemory( ) system call. Each section of memory is read in the manner outlined in the previous step, updating a cryptographic hash as the process proceeds.

The system compares the two hashes resulting from the immediately preceding steps. If they match, the image in memory has not been tampered with.

Application Interface Functions

As described above, interfaces are exposed to application programs so that application programs can take advantage of protected storage features without having to implement sophisticated encryption schemes and without having to make RPC calls. These interfaces and their functions are described in an attached appendix that forms part of this document. The appendix also provides explanations regarding the proper usage of the interfaces.

Conclusion

The invention provides a versatile and efficient architecture that provides a number of advantages over the prior art. One significant advantage is that different application programs can utilize a single, provided server to store core data secrets in a central storage area. This promotes consistency among the applications and removes significant overhead from the applications. The user interface is one area that benefits from the consistency provided by the storage system described above, since user prompts are generated by the system rather than by the individual application programs. Storing data items in a uniform manner also allows them to be managed by a single management program that is independent of the application programs themselves.

Another significant advantage of the invention is that the underlying details of securing data items are hidden from calling application programs. Thus, program developers do not have to implement sophisticated security measures; such measures can be implemented with simple calls to the storage system described herein. An added benefit is that new technologies such as smart cards will be available to application programs without extensive reprogramming.

The invention protects secrets from user-oriented and software-oriented attacks, including attacks from viruses. Significantly, access control is managed outside the application programs that generate and access data items. Because applications do not have direct access to keying material or other control data, access to one piece of data does not imply access to any other data. Furthermore, the storage system itself does not retain the information required to decrypt stored data items. Rather, the user must be present and must supply a correct password to allow data decryption.

A further important benefit of the invention is that users are not forced to explicitly enter passwords when data access is required. Rather, user authentication is performed once, when the user logs on to the computer or network. This logon information is used for both user authentication and to derive keys for data encryption and decryption. Steps are taken to backup or escrow keys derived from logon information, so that such keys can be recovered when the user's password changes without notification to the storage system. However, recovery of escrowed keys requires a successful network logon.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

We claim:

1. A method of securely storing and recovering data protection keys, comprising the following steps:
    deriving a client key from a user secret that is supplied by a user during network logon procedures;
    securing user data on a client computer with the client key;
    sending the client key to a network supervisory computer that authenticates network users during user logon procedures;
    encrypting a data combination at the network supervisory computer, the data combination including the client key and a user identification corresponding to a currently authenticated current user of the client computer;
    returning the encrypted data combination to the client computer;
    storing the encrypted data combination at the client computer;
    sending the encrypted data combination to the network supervisory computer in order to recover the client key;
    decrypting the data combination at the network supervisory computer to obtain the client key and the user identification in response to receiving the encrypted data combination from the client computer;
    returning the client key to the client computer only if the obtained user identification corresponds to the currently authenticated user of the client computer.

2. A method as recited in claim 1, further comprising an additional step of encrypting the client key before sending it to the network supervisory computer.

3. A method as recited in claim 1, further comprising the following additional steps:
    encrypting the client key before sending it to the network supervisory computer;
    decrypting the client key at the client computer after returning the client key to the client computer.

4. A method as recited in claim 1, further comprising an additional step of creating a message authentication code based at least in part on the client key and the user identification, the data combination further including the message authentication code.

5. A method as recited in claim 1, further comprising an additional step of creating a message authentication code based at least in part on the client key and the user identification, the data combination further including the message authentication code, wherein the step of returning the client key is conditioned upon a successful authentication of the client key and the user identification using the message authentication code.

6. A method as recited in claim 1, wherein the encrypting step is performed using an encryption key that is derived from a master key and a random key, the method further comprising the following additional steps:
    returning the random key with the encrypted data combination to the client computer; and
    storing the random key at the client computer.

7. A method as recited in claim 1, wherein the encrypting step is performed using an encryption key that is derived from a master key and a random key, the method further comprising the following additional steps:
    returning the random key with the encrypted data combination to the client computer;
    storing the random key at the client computer;
    sending the random key to the network supervisory computer from the client computer in order to recover the client key.

8. A method as recited in claim 1, further comprising the following additional steps:

creating a message authentication code based at least in part on the client key and the user identification, the data combination further including the message authentication code, wherein the message authentication code is created using an authentication key that is derived from a master key and a random key;

returning the random key with the encrypted data combination to the client computer;

storing the random key at the client computer.

9. A method as recited in claim 1, further comprising the following additional steps:

creating a message authentication code based at least in part on the client key and the user identification, the data combination further including the message authentication code, wherein the message authentication code is created using an authentication key that is derived from a master key and a random key;

returning the random key with the encrypted data combination to the client computer;

storing the random key at the client computer;

sending the random key to the network supervisory computer from the client computer in order to recover the client key;

wherein the step of returning the client key is conditioned upon a successful authentication of the client key and the user identification using the message authentication code.

10. A method as recited in claim 1, further comprising the following additional steps:

encrypting the client key before sending it to the network supervisory computer;

creating a message authentication code based at least in part on the client key and the user identification, the data combination further including the message authentication code, wherein the message authentication code is created using an authentication key that is derived from a master key and a first random key;

wherein the encrypting step is performed using an encryption key that is derived from a master key and a second random key;

returning the first and second random keys with the encrypted data combination to the client computer;

storing the first and second random keys at the client computer.

11. A method as recited in claim 1, further comprising the following additional steps:

encrypting the client key before sending it to the network supervisory computer creating a message authentication code based at least in part on the client key and the user identification, the data combination further including the message authentication code, wherein the message authentication code is created using an authentication key that is derived from a master key and a first random key;

wherein the encrypting step is performed using an encryption key that is derived from a master key and a second random key;

returning the first and second random keys with the encrypted data combination to the client computer;

storing the first and second random keys at the client computer;

sending the first and second random keys to the network supervisory computer from the client computer in order to recover the client key;

wherein the step of returning the client key is conditioned upon a successful authentication of the client key and the user identification using the message authentication code.

12. A network supervisory computer that is programmed to perform steps comprising:

authenticating a current user of a network client through a network logon procedure;

receiving a data item from the network client;

encrypting a data combination that includes the data item and a user identification corresponding to the currently authenticated user of the network client;

returning the encrypted data combination to the client computer.

13. A network supervisory computer as recited in claim 12, wherein the data item is derived from a user logon secret.

14. A network supervisory computer as recited in claim 12, being further programmed to perform an additional step of creating a message authentication code based at least in part on the data item and the user identification, the data combination further including the message authentication code.

15. A network supervisory computer as recited in claim 12, wherein the encrypting step is performed using an encryption key that is derived from a master key and a random key, the network supervisory computer being programmed to perform an additional step of returning the random key with the encrypted data combination to the client computer.

16. A network supervisory computer as recited in claim 12 being further programmed to perform additional steps comprising:

creating a message authentication code based at least in part on the data item and the user identification, the data combination further including the message authentication code, wherein the message authentication code is created using an authentication key that is derived from a master key and a random key;

returning the random key with the encrypted data combination to the client computer.

17. A network supervisory computer as recited in claim 12 being further programmed to perform additional steps comprising:

creating a message authentication code based at least in part on the data item and the user identification, the data combination further including the message authentication code, wherein the message authentication code is created using an authentication key that is derived from a master key and a first random key;

wherein the encrypting step is performed using an encryption key that is derived from a master key and a second random key;

returning the first and second random keys with the encrypted data combination to the client computer.

18. A computer network having a plurality of network supervisory computers as recited in claim 12.

19. A computer network as recited in claim 18, wherein the network supervisory computers each perform the encrypting step using one or more encryption secrets that are replicated between the network supervisory computers.

20. A computer network as recited in claim 18, wherein each network client alternatively selects one of the network supervisory computers to perform the authenticating, receiving, encrypting, and returning steps.

21. A computer network as recited in claim 18, wherein the data item is derived from a user logon secret.

22. A computer network as recited in claim 18, each network supervisory computer being further programmed to perform an additional step of creating a message authentication code based at least in part on the data item and the user identification, the data combination further including the message authentication code.

23. A method of securely storing a data item for an authenticated user of a client computer, comprising the following steps:
sending the data item to a network supervisory computer;
encrypting a data combination at the network supervisory computer, the data combination including the data item and a user identification corresponding to an authenticated current user of the client computer;
returning the encrypted data combination to the client computer;
storing the encrypted data combination at the client computer.

24. A method as recited in claim 23, comprising an additional step of deriving the data item from a user logon secret.

25. A method as recited in claim 23, wherein the network supervisory computer performs a step of authenticating the current user of the client computer during a network logon procedure.

26. A method as recited in claim 23, further comprising an additional step of encrypting the data item before sending it to the network supervisory computer.

27. A method as recited in claim 23, further comprising an additional step of creating a message authentication code based at least in part on the data item and the user identification, the data combination further including the message authentication code.

28. A method as recited in claim 23, wherein the encrypting step is performed using an encryption key that is derived from a master key and a random key, the method further comprising the following additional steps:
returning the random key with the encrypted data combination to the client computer; and
storing the random key at the client computer.

29. A method as recited in claim 23, further comprising the following additional steps:
creating a message authentication code based at least in part on the data item and the user identification, the data combination further including the message authentication code, wherein the message authentication code is created using an authentication key that is derived from a master key and a random key;
returning the random key with the encrypted data combination to the client computer;
storing the random key at the client computer.

30. A method of securely storing a data item for an authenticated user of a client computer, the method comprising the following steps:
deriving the data item from a user logon secret;
encrypting the data item;
sending the encrypted data item to a network supervisory computer that authenticates users of the client computer;
creating a message authentication code based at least in part on the data item and a user identification corresponding to the authenticated user of the client computer, wherein the message authentication code is created using an authentication key that is derived from a master key and a first random key;
encrypting a data combination at the network supervisory computer using an encryption key that is derived from a master key and a second random key, the data combination including the encrypted data item, the user identification, and the message authentication code;
returning the encrypted data combination, the first random key, and the second random key to the client computer;
storing the encrypted data combination, the first random key, and the second random key at the client computer.

31. A method as recited in claim 30, wherein the first random key is returned to the client computer as part of the encrypted data combination.

32. A method of restoring a data item for an authenticated user of a client computer, comprising the following steps:
sending an encrypted data combination to a network supervisory computer from the client computer, the data combination including the data item and a user identification;
decrypting the encrypted data combination at the network supervisory computer to obtain the data item and the user identification;
returning the data item to the client computer only if the user identification corresponds to the authenticated user of the client computer.

33. A method as recited in claim 32, wherein the data item is derived from a user logon secret.

34. A method as recited in claim 32, wherein the data item is encrypted within the data combination, the method further comprising a step of decrypting the data item at the client computer after returning the encrypted data item to the client computer.

35. A method as recited in claim 32, wherein:
the data combination includes a message authentication code;
the returning step is conditioned upon a successful authentication of the data item and the user identification using the message authentication code.

36. A method as recited in claim 32, further comprising:
sending a locally stored key to the network supervisory computer from the client computer;
wherein the decrypting step is performed using a decryption key that is derived from a master key and the locally stored key.

37. A method as recited in claim 32, wherein:
the data combination includes a message authentication code;
the method further comprises a step of sending a locally stored key to the network supervisory computer from the client computer;
the returning step is conditioned upon a successful authentication of the data item and the user identification using the message authentication code, wherein the authentication is based on an authentication key that is derived from a master key and the locally stored key.

38. A method of restoring a data item for an authenticated user of a client computer, comprising the following steps:
sending an encrypted data combination to a network supervisory computer from the client computer, the data combination including the data item, a user identification, and a message authentication code, the data item being encrypted within the data combination;
decrypting the encrypted data combination at the network supervisory computer to obtain the encrypted data item and the user identification;
returning the encrypted data item to the client computer only if (a) the user identification corresponds to an authenticated current user of the client computer and (b) the encrypted data item and the user identification are successfully authenticated using the message authentication code;

decrypting the data item at the client computer.

39. A method as recited in claim 38, wherein the data item is derived from a user logon secret.

40. A method as recited in claim 38, further comprising an additional step of sending a locally stored key to the network supervisory computer from the client computer, wherein the decrypting step is performed using a decryption key that is derived from a master key and the locally stored key.

41. A method as recited in claim 38, further comprising an additional step of sending a locally stored key to the network supervisory computer from the client computer, wherein the authentication is based on an authentication key that is derived from a master key and the locally stored key.

42. A method as recited in claim 38, further comprising the following additional steps:

sending a first locally stored key to the network supervisory computer from the client computer;

sending a second locally stored key to the network supervisory computer from the client computer;

wherein the authentication is based on an authentication key that is derived from a master key and the first locally stored key; and wherein the decrypting step is performed using a decryption key that is derived from a master key and the second locally stored key.

43. A system for storing and recovering data items and for protecting them from unauthorized access, comprising:

a network supervisory computer that authenticates users of client computers;

a client computer that communicates with the network supervisory computer, the client computer being programmed to send a data item to the network supervisory computer;

the network supervisory computer being programmed to encrypt a data combination comprising the data item and a user identification corresponding to an authenticated current user of the client computer, and to return the encrypted data combination to the client computer;

the client computer being programmed to store the encrypted data combination and to send the encrypted data combination to the network supervisory computer to recover the data item;

the network supervisory computer being programmed to decrypt the data combination to obtain the data item and the user identification in response to receiving the encrypted data combination from the client computer, and to return the data item to the client computer only if the user identification corresponds to the currently authenticated user of the client computer.

44. A system as recited in claim 43, wherein client computer derives the data item from a user logon secret.

45. A system as recited in claim 43, wherein the client computer is programmed to encrypt the data item before sending it to the network supervisory computer.

46. A system as recited in claim 43, wherein the client computer is programmed to encrypt the data item before sending it to the network supervisory computer and to decrypt the data item upon receiving it from the network supervisory computer.

47. A system as recited in claim 43, wherein the network supervisory computer is programmed to create a message authentication code based at least in part on the data item and the user identification, the data combination further including the message authentication code.

48. A system as recited in claim 43, wherein:

the network supervisory computer is programmed to create a message authentication code based at least in part on the data item and the user identification, the data combination further including the message authentication code the network supervisory computer is programmed to condition the return of the data item to the client computer upon a successful authentication of the data item and the user identification using the message authentication code.

49. A system as recited in claim 43, wherein the network supervisory computer encrypts the data combination using an encryption key that is derived from a master key and a random key, and to return the random key with the encrypted data combination to the client computer.

50. A system as recited in claim 43, wherein:

the network supervisory computer encrypts the data combination using an encryption key that is derived from a master key and a random key, and to return the random key with the encrypted data combination to the client computer;

the client computer sends the random key to the network supervisory computer in order to recover the client key.

51. A system as recited in claim 43, wherein:

the network supervisory computer is programmed to create a message authentication code based at least in part on the data item and the user identification, the data combination further including the message authentication code, wherein the message authentication code is created using an authentication key that is derived from a master key and a random key;

the network supervisory computer returns the random key with the encrypted data combination to the client computer.

52. A system as recited in claim 43, wherein:

the network supervisory computer is programmed to create a message authentication code based at least in part on the data item and the user identification, the data combination further including the message authentication code, wherein the message authentication code is created using an authentication key that is derived from a master key and a random key;

the network supervisory computer returns the random key with the encrypted data combination to the client computer.

the client computer sends the random key to the network supervisory computer in order to recover the data item;

the network supervisory computer is programmed to condition the return of the data item to the client computer upon a successful authentication of the data item and the user identification using the message authentication code.

53. A computer-readable storage medium containing instructions that are executable by a network supervisory computer to perform steps comprising:

authenticating a current user of a network client through a network logon procedure;

receiving a data item from the network client;

encrypting a data combination that includes the data item and a user identification corresponding to the currently authenticated user of the network client;

returning the encrypted data combination to the client computer.

54. A computer-readable storage medium as recited in claim 53, data item is derived from a user logon secret supplied during the network logon procedure.

55. A computer-readable storage medium as recited in claim 53, containing instructions for performing an additional step of creating a message authentication code based at least in part on the data item and the user identification, the data combination further including the message authentication code.

56. A computer-readable storage medium as recited in claim 53, wherein the encrypting step is performed using an encryption key that is derived from a master key and a random key, the instructions being executable to perform an additional step of returning the random key with the encrypted data combination to the client computer.

57. A computer-readable storage medium as recited in claim 53 containing further instructions for performing additional steps comprising:
   creating a message authentication code based at least in part on the data item and the user identification, the data combination further including the message authentication code, wherein the message authentication code is created using an authentication key that is derived from a master key and a random key;
   returning the random key with the encrypted data combination to the client computer.

58. A computer-readable storage medium as recited in claim 53 containing further instructions for performing additional steps comprising:
   creating a message authentication code based at least in part on the data item and the user identification, the data combination further including the message authentication code, wherein the message authentication code is created using an authentication key that is derived from a master key and a first random key;
   wherein the encrypting step is performed using an encryption key that is derived from a master key and a second random key;
   returning the first and second random keys with the encrypted data combination to the client computer.

59. A computer-readable storage medium containing instructions that are executable by a network client to perform steps comprising:
   deriving a client key from a user secret that is supplied by a user during network logon procedures;
   securing user data with the client key;
   sending the client key to a network supervisory computer that authenticates network users during user logon procedures;
   in response to sending the client key, receiving an encrypted data combination from the network supervisory computer, the encrypted data combination being decryptable by the network supervisory computer to obtain the client key, wherein the encrypted data combination is not decryptable by the network computer;
   storing the encrypted data combination for use in recovering the client key when the user secret changes.

60. A computer-readable storage medium as recited in claim 59 containing further instructions for performing an additional step of sending the encrypted data combination to the network supervisory computer in order to recover the client key.

61. A computer-readable storage medium as recited in claim 59 containing further instructions for performing an additional step of encrypting the client key before sending it to the network supervisory computer.

* * * * *